Sept. 2, 1941.  W. W. HARVEY  2,254,680
WIND DIRECTION INDICATOR
Filed Aug. 4, 1938  3 Sheets-Sheet 2

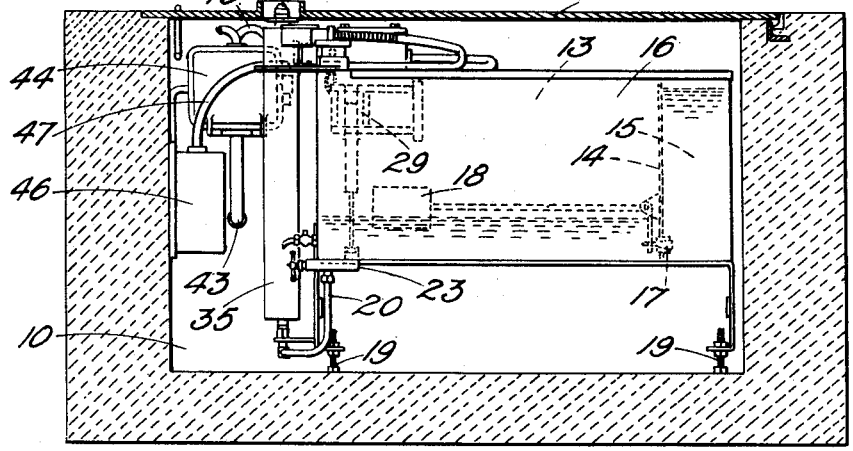
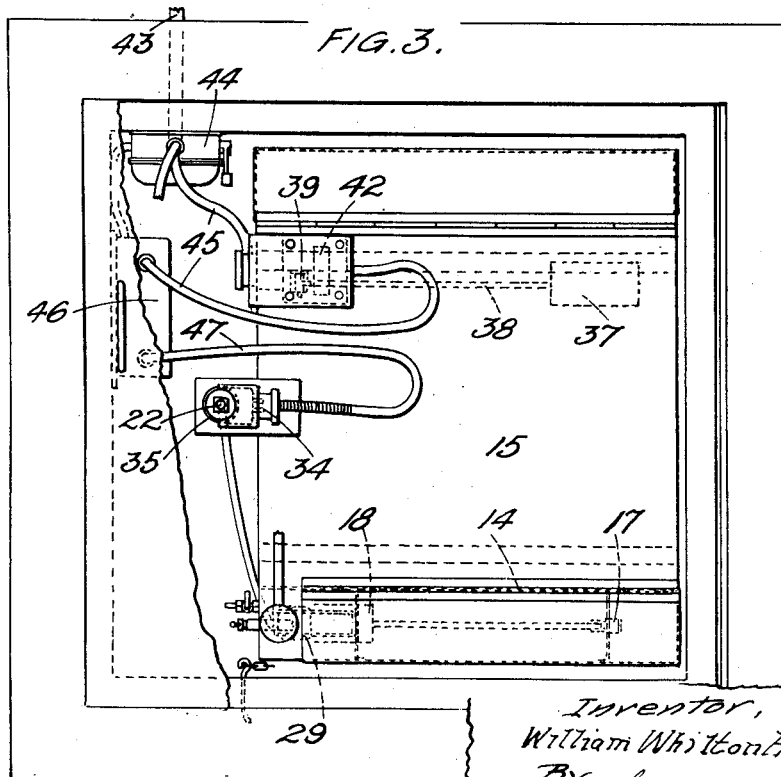

Inventor,
William Wilton Harvey
By, Stevens and Davis
Attys.

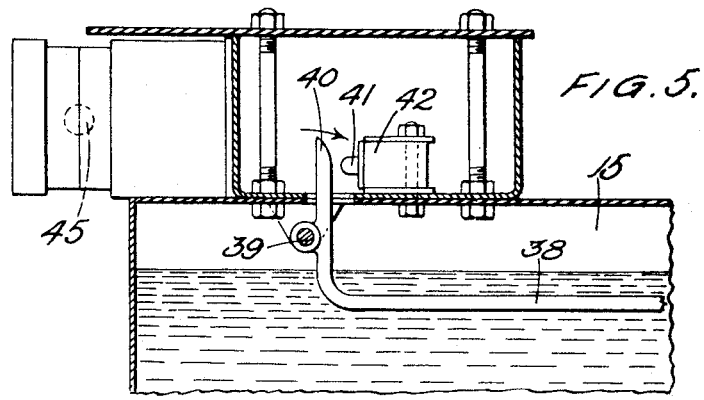
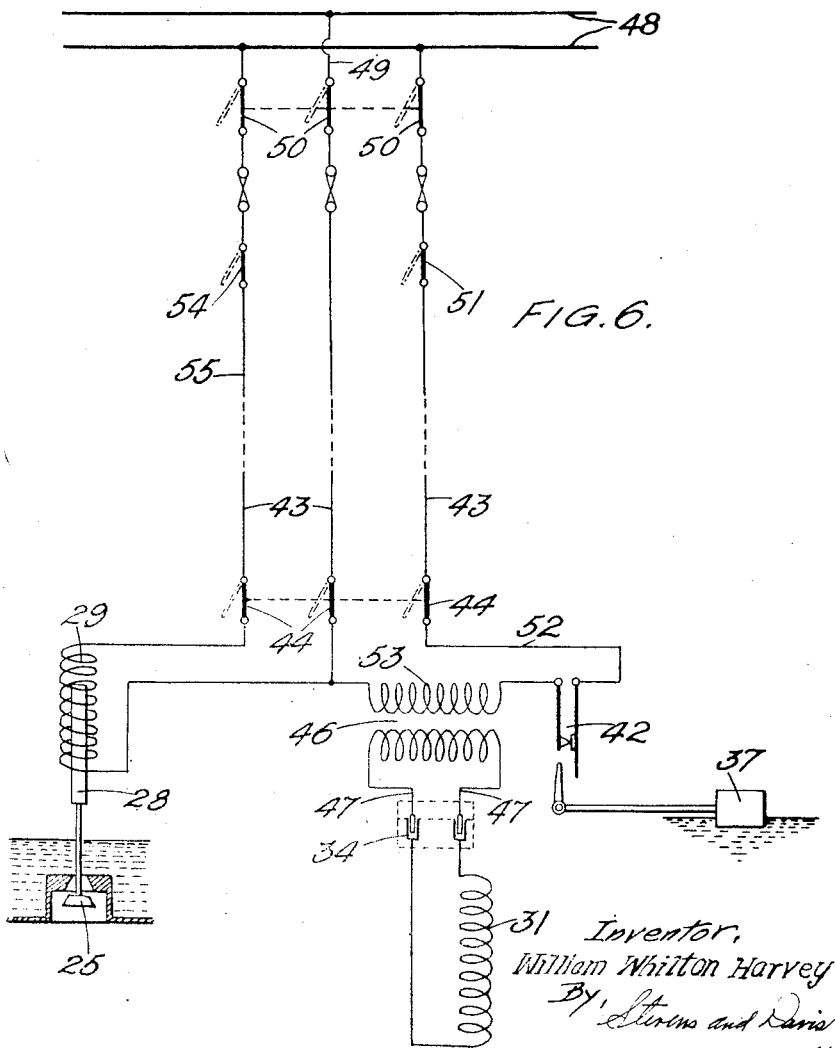

Patented Sept. 2, 1941

2,254,680

UNITED STATES PATENT OFFICE 2,254,680

WIND DIRECTION INDICATOR

William Whilton Harvey, Feltham, England, assignor to General Aircraft Limited, Feltham, England Application August 4, 1938, Serial No. 223,131
In Great Britain September 6, 1937

2 Claims. (Cl. 73—188)

This invention relates to apparatus for producing so-called "smoke" for the purpose of wind direction indicating by the heating and consequent vaporisation of a substance, which, for convenience, will hereafter be referred to as "smoke fuel." The invention is concerned with that kind of apparatus in which an oil or like fuel is heated by blow-torch, electric, or other means. The invention has for an object to eliminate certain difficulties and complications arising out of known means, and seeks to produce an economy in smoke fuel, whilst providing an apparatus which is safe in operation. A further object of the invention is to provide apparatus having few working parts and occupying a comparatively small space, which is reliable in action, and which need present little obstruction to aircraft taxi-ing on the aerodrome. Another object of the invention is to provide apparatus which may be controlled from the control room of an aerodrome, and which does not require frequent attention.

In the present invention, the smoke fuel is vaporised in a chamber having a connection with a source of fuel and an egress for vaporised fuel. The chamber may take the form of a rising conduit with an upper outlet for vapour and a lower connection to the fuel supply, and such conduit may be externally heated by electric or other means.

A still further object of the invention is to obviate the risk of over-heating the chamber in which the fuel is vaporised, and for this purpose there may be provided a float-operated switch controlling the heater circuit.

Yet another object of the invention resides in the maintenance of a uniform plume of smoke issuing from the chamber, whilst at the same time allowing the quantity of smoke to be varied according to the prevailing weather conditions.

In one form of the invention, the fuel level in the chamber is maintained substantially constant by a float controlled valve, and in conjunction therewith, there may be provided a needle, or like valve, for varying the quantity of fuel flowing into the chamber from the reservoir.

A further feature of the invention is an electromagnetically-operated valve for completely shutting off the supply of fuel to the chamber should it be desirable to check the egress of vapour at short notice.

The invention is illustrated by way of example in the accompanying drawings, in which:

Figure 1 shows a smoke-producing wind-indicating apparatus in accordance with the invention, installed in a pit sunk in the aerodrome surface;

Figure 2 is a sectional view through the pit showing the apparatus in elevation on a larger scale;

Figure 3 is a plan view of the apparatus shown in Figure 2;

Figure 5 shows diagrammatically a float-operated switch;

Figure 6 is a wiring diagram of a suitable electric circuit controlling the electric supply to the apparatus.

Figure 4:
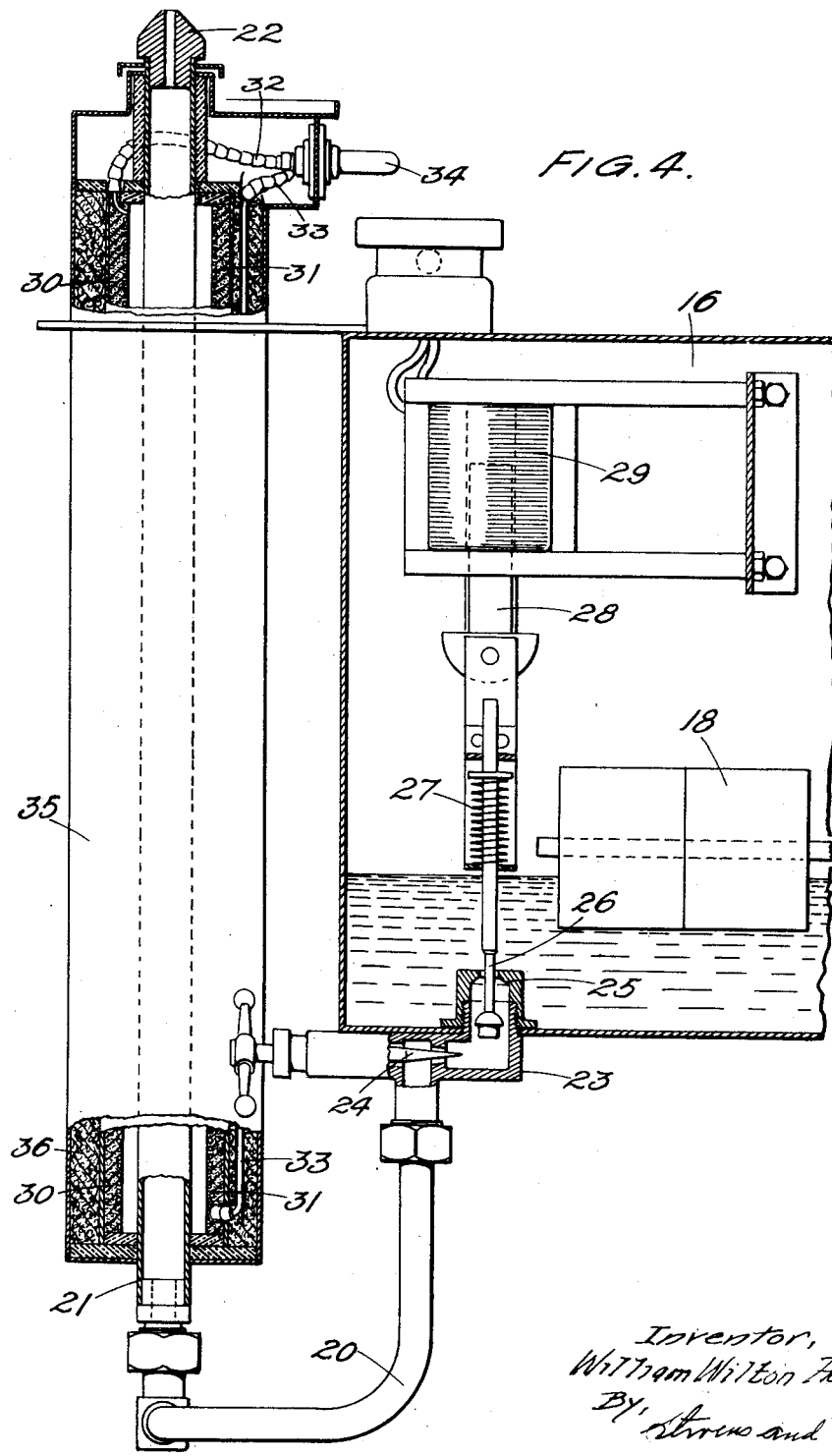
Figure 4 is a detail view in part section of the heater element conduit and its connection to the float chamber.

As is seen in Figure 1 the apparatus is housed within a concrete lined pit 10 sunk in the surface of the aerodrome 11. A cover 12 is hinged along one edge so that it may be raised to the position shown in dotted line in Figure 1. The cover plate is of sufficiently robust construction to enable aircraft to land upon and taxi over the pit without causing damage. The smoke-producing apparatus comprises a tank 13, which is divided by a wall 14 into two compartments 15 and 16. The compartment 15, which is hereafter referred to as the reservoir tank, is of comparatively large capacity, whilst the compartment 16, hereafter referred to as the float chamber, is supplied from the reservoir tank 15, and is of comparatively small capacity. The flow of fuel from the reservoir tank 15 to the float chamber 16 is controlled by a valve 17 operated by a float 18 in the float chamber, so as to maintain approximately a constant level in the latter. The tank 13 rests in the pit 10 on levelling screws 19.

From the bottom of the float chamber 16 a pipeline connection 20 leads to the bottom end of a rising conduit 21, which at its upper end carries a nipple 22 forming a jet for vapour issuing from the conduit 21. The union 23 attaching the pipeline 20 to the chamber 16 incorporates a needle valve 24 by which the flow to the conduit from the chamber can be regulated. A further valve seating 25 co-operates with a valve plunger 26, which is connected through a compression spring 27 to the armature 28 of an electromagnet, the current coil of which is shown at 29. The valve plunger 26 is arranged by co-operation with the seating 25 to block all flow of fuel from the chamber 16 to the conduit 21, when the current to the electromagnet is switched on. It is thus possible to cut off the emission of smoke quickly and remotely by means of a switch in the aerodrome control room. This may be desirable where the wind is light and variable and no true indication could be given by the plume of smoke.

The conduit 21 is surrounded by a cylindrical heater element 30, comprising a cylinder of refractory material on the internal curved surface of which is embedded a resistance wire 31, the leads 32 and 33 to the extremities thereof being secured to plug fittings 34. The heater element and conduit are contained in a casing 35 with a packing 36 of asbestos or other suitable insulating material.

In the reservoir tank there is pivotally supported a further float 37 (see Figures 3 and 5) the arm 38 of which is pivoted at 39. The extremity 40 of the arm 38 is arranged to abut against the plunger 41 of a switch 42 when the fuel in the reservoir tank drops below a predetermined level so as to open the heater circuit. It will be seen in Figures 2 and 3 that the main electric supply for the apparatus is led to the pit by cable 43 and is switched by a main isolating switch 44, whence it is conducted by cables 45 to the primary of a transformer 46 with the float operated switch interposed in one lead. The secondary winding of the transformer 46 is connected by cable 47 to the plug fittings 34. The float operated switch by breaking the primary circuit of the transformer, when the fuel reaches a low level, switches off the current to the heater resistance, and thus prevents overheating of the resistance. The transformer is used to step down the voltage from the normal supply to a comparatively low value (e. g. 60 volts) to increase the useful life of the winding.

The complete electric circuit is diagrammatically indicated in Figure 6. The supply is drawn from the mains 48 and the two circuits respectively for the heater and the electromagnet have a common return lead 49. A main isolation switch 50 for the whole apparatus is provided in the control room of the aerodrome, and in the pit there is the further isolating switch 44 referred to above. The heater circuit, which is controlled in the control room by switch 51, includes in series with leads 49 and 52 the transformer primary winding 53 and float operated switch 42. The transformer secondary winding is shown connected to the heater coil 31 through the plug fittings 34. The electromagnet circuit is controlled in the control room by switch 54, and includes the coil 29 in series in the leads 49 and 55.

The operation of the apparatus described is as follows. The reservoir tank 51 is filled with suitable oil fuel when the float chamber will fill to the level permitted by the valve 17. If the heater be now switched on and the electromagnetically controlled valve 25 be open fuel in the rising conduit 21 is vapourised and issues from the upper end through the nipple 22 in the form of a visible plume, which follows the direction of the wind and provides a visible indication of that direction. The quantity of smoke can be regulated by the needle valve 24 and the maximum amount may be limited by the internal pressure created within the conduit by the restriction of the jet, which not only causes the smoke to emit as a plume, but may depress the fuel level should the pressure become excessive. Further the smoke is directed away from the heater element and thus the danger of fire is minimised, whilst no combustion can take place within the closed chamber or conduit when it is full of vapourised and liquid fuel.

It will be appreciated that in certain cases the fuel may be heated by the flame of a blow-torch or similar heater, in which case gills might well be provided on the conduit to distribute the heat more uniformly. Further the supply of fuel may in certain cases be by means of an air pressure applied in the reservoir.

What I claim is:

1. Direction of wind indicating apparatus comprising, a primary reservoir for liquid fuel, a secondary reservoir for liquid fuel, a pipe extending above the level of the secondary reservoir, means connecting the lower end of said pipe and said secondary reservoir, a float-controlled valve between said primary and secondary reservoirs to maintain a certain level within said secondary reservoir, means defining a restricted egress orifice at the upper end of said pipe, and means for externally heating said pipe substantially throughout its length.

2. Direction of wind indicating apparatus comprising, a primary reservoir for liquid fuel, a secondary reservoir for liquid fuel, a pipe extending above the level of the secondary reservoir, means connecting the lower end of said pipe and said secondary reservoir, a float-controlled valve between said primary and secondary reservoirs to maintain a certain level within said secondary reservoir, means defining a restricted egress orifice at the upper end of said pipe, resistance elements surrounding said pipe for substantially its entire length, and means for supplying an electric current at uniform voltage to said resistance elements.

WILLIAM WHILTON HARVEY.